(12) United States Patent
Wolf

(10) Patent No.: US 7,987,772 B2
(45) Date of Patent: Aug. 2, 2011

(54) PASSIVE HEATER

(75) Inventor: Larry R. Wolf, Avilla, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 196 days.

(21) Appl. No.: 11/971,109

(22) Filed: Jan. 8, 2008

(65) Prior Publication Data

US 2008/0241328 A1    Oct. 2, 2008

Related U.S. Application Data

(60) Provisional application No. 60/884,269, filed on Jan. 10, 2007.

(51) Int. Cl.
*A23L 1/01* (2006.01)
*A47J 27/02* (2006.01)

(52) U.S. Cl. ............. 99/340; 99/352; 99/422; 126/37 B

(58) Field of Classification Search ........... 99/326–333, 99/349–351, 339, 444–450, 422–425, 403–418, 99/645, 330, 340, 352; 426/520–523; 219/214, 219/200, 394–397, 521–525; 392/477, 466, 392/465; 126/37 A, 37 B, 220
See application file for complete search history.

(56) References Cited

U.S. PATENT DOCUMENTS

| | | | | |
|---|---|---|---|---|
| 1,575,451 A | * | 3/1926 | Scheib | 126/39 B |
| 2,002,894 A | * | 5/1935 | Kahn | 126/214 B |
| 3,130,719 A | * | 4/1964 | Mayer et al. | 126/37 B |
| 3,644,707 A | * | 2/1972 | Costello | 392/341 |
| 3,891,827 A | * | 6/1975 | Wyse | 392/477 |
| 5,156,082 A | * | 10/1992 | Fukuda et al. | 99/326 |
| 5,811,766 A | * | 9/1998 | Fabrikant et al. | 219/521 |
| 5,924,325 A | * | 7/1999 | Brucher et al. | 74/106 |
| 6,145,431 A | | 11/2000 | Tippmann et al. | |
| 6,539,839 B1 | | 4/2003 | Tippmann | |
| 6,795,645 B2 | * | 9/2004 | Hygema et al. | 392/477 |
| 2005/0263010 A1 | | 12/2005 | Fincher et al. | |

OTHER PUBLICATIONS

American Griddle, Product Information for "Steam Shell", obtained from internet at www.americangriddle.com at least as early as Jan. 8, 2008.
US 5,896,807, 04/1999, Tippmann (withdrawn)

* cited by examiner

*Primary Examiner* — Samuel M Heinrich
(74) *Attorney, Agent, or Firm* — Baker & Daniels LLP

(57) ABSTRACT

A passive heater including a carriage actuatable to move along a cooking surface and a cover. In one exemplary embodiment, the carriage may be positioned on a guide bar to direct movement of the carriage along the cooking surface. The cover may be connected to the carriage and positionable near the cooking surface. Advantageously, positioning the cover near the cooking surface provides for the retention of nearby heat. Thus, the top surface of a food item cooking on the cooking surface may be heated by placing the cover over the food item. In another exemplary embodiment, the cover has a lifted position and a lowered position. By moving the cover from the lifted position to the lowered position, the cover may contact the cooking surface to surround food cooking thereon. In another exemplary embodiment, the lowered positioned may be spaced upwardly from the cooking surface, allowing the cover to cap food thereon.

16 Claims, 4 Drawing Sheets

PASSIVE HEATER

CROSS-REFERENCE TO RELATED APPLICATIONS

This application claims the benefit under Title 35 U.S.C. §119(e) of U.S. Provisional Patent Application Ser. No. 60/884,269, entitled PASSIVE HEATER, filed on Jan. 10, 2007, the entire disclosure of which is expressly incorporated by reference herein.

BACKGROUND

1. Field of the Invention

The present invention relates to a passive heater, particularly to a passive heater for use in conjunction with a cooking surface.

2. Description of the Related Art

Numerous devices having heated cooking surfaces are utilized in the food service industry. These devices may be formed as griddles or stoves, for example, having heated cooktops upon which food to be cooked is placed. These devices transfer thermal energy from the cooktop to the bottom of the food thereon. Once the bottom surface of the food is sufficiently cooked, the food may be flipped or otherwise repositioned so that different surfaces of the food are in direct contact with the cooktop. During cooking, it may be desirable to keep the top surface, i.e., the surface not in contact with the cooktop, of the food warm. Similarly, cheese or other condiments which need to be heated may be added to the top surface of a hamburger, for example.

SUMMARY

The present invention relates to a passive heater, particularly to a passive heater for use in conjunction with a cooking surface. In one exemplary embodiment, the passive heater includes a carriage actuatable to move along a cooking surface and a cover. In one exemplary embodiment, the carriage may be positioned on a guide bar to direct movement of the carriage along the cooking surface. The cover may be connected to the carriage and may be positionable near the cooking surface. Advantageously, positioning the cover near the cooking surface provides for the retention of nearby heat. Thus, the top surface of a food item cooking on the cooking surface may be heated by placing the cover over the food item. In another exemplary embodiment, the cover has a lifted position and a lowered position. By moving the cover from the lifted position to the lowered position, the cover may contact the cooking surface to surround food cooking thereon. Advantageously, by positioning the cover to surround uncooked food, contact between the uncooked food and any other food on the cooking surface is substantially prevented. In another exemplary embodiment, the lowered position of the cover may space the cover upwardly from the cooking surface, allowing the cover to cap food thereon.

Advantageously, the present passive heater provides for the heating of a food item on a cooking surface, without the need to create thermal energy in addition to the thermal energy created by the cooking surface. This allows the passive heater to function without components, such as active radiant, conductive, or convective heating elements, which require additional energy inputs. As a result, use of the passive heater may decrease operating costs. Further, the lack of sensitive components, such as electrical connections, makes the passive heater easier to clean, reducing labor costs. Additionally, the use of the present passive heater allows for the retention of moisture around the food cooking on the cooking surface. This helps to prevent the food from drying out during cooking.

In one form thereof, the present invention provides a passive heater including a carriage actuatable to move along a cooking surface, and a cover connected to the carriage, whereby actuation of the carriage moves the cover along the cooking surface, the cover positionable to contact the cooking surface, whereby heat is retained between the cover and the cooking surface.

In another form thereof, the present invention provides a passive heater including a carriage positioned adjacent a cooking surface, wherein the carriage may be actuated to move along the cooking surface, and a cover having a lifted position and a lowered position, the cover capable of being moved from the lifted position to the lowered position to cap food on the cooking surface.

In another form thereof, the present invention provides a method of heating food on a cooking surface including the steps of actuating a passive heater having a carriage and a cover to position the cover over food on the cooking surface, and lowering the cover toward the cooking surface to at least partially cap the food while maintaining the position of the carriage.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
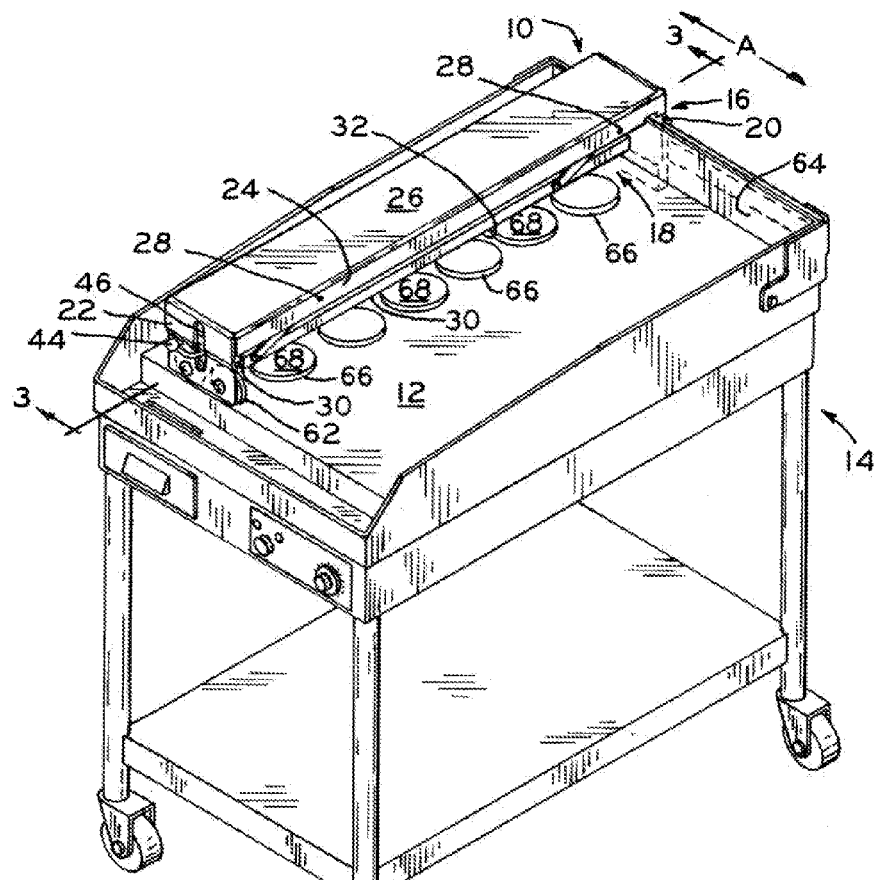
FIG. 1 is a perspective view of the passive heater of the present invention adjacent a cooking surface.

Referring to FIG. 1, passive heater 10 is shown positioned adjacent cooking surface 12 of griddle 14. While passive heater 10 is described and depicted herein with specific reference to cooking surface 12 of griddle 14, passive heater 10 may be utilized with any device having a cooking surface, such as a halogen cook top or a charbroiler. Additionally, as stated above, the device of the present invention is a passive heater. Passive heaters lack a heating element which generates thermal energy, such as an active radiant heating element. In a passive heater, the system only controls or directs thermal energy in a useful way. In contrast, in an active heater, a component of the system generates thermal energy and the system utilizes the thermal energy so generated in performing its intended function.

Figure 4:
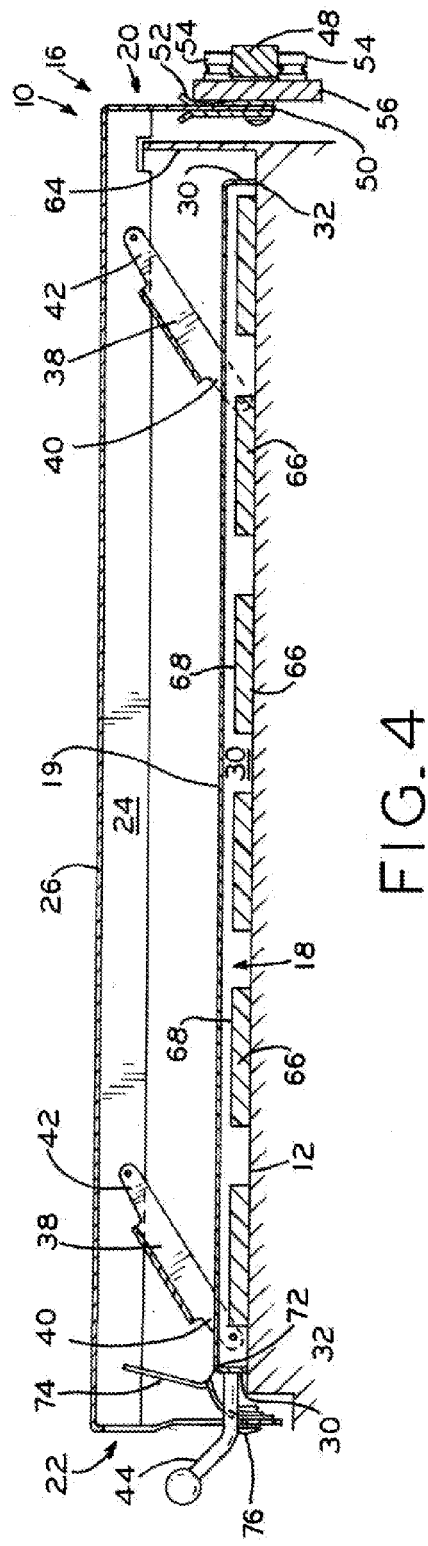
FIG. 4 is a partial cross sectional view of the passive heater and cooking surface of FIG. 1, taken along line 4-4 of FIG. 2.
Figure 5:
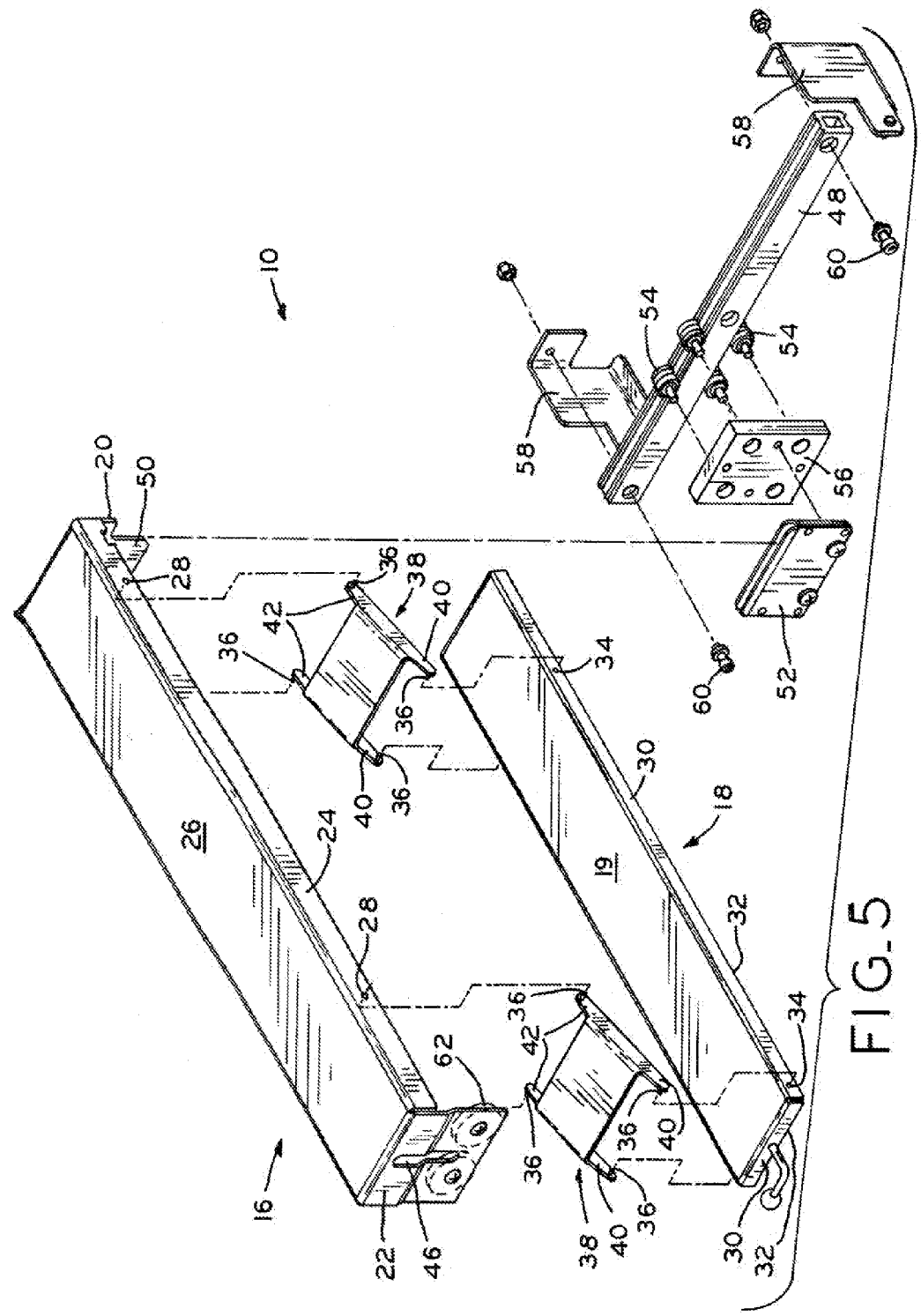
FIG. 5 is an exploded view of the passive heater of FIG. 1.

Passive heater 10 includes carriage 16 and cover 18, as best seen in FIG. 5. Carriage 16 may be actuated to move cover 18 over cooking surface 12. As shown in FIG. 5, carriage 16 includes first end 20 and second end 22. First end 20 and second end 22 are connected via rails 24 positioned therebetween. As shown in FIGS. 1-6, carriage 16 further includes top surface 26 connected between rails 24 and first and second ends 20, 22. As shown in FIG. 5, rails 24 of carriage 16 include apertures 28 formed therein. In one exemplary embodiment, carriage 16 lacks top surface 26. In this embodiment, at least a portion of cover 18 of passive heater 10 may be viewed from directly above passive heater 10.

Figure 3:
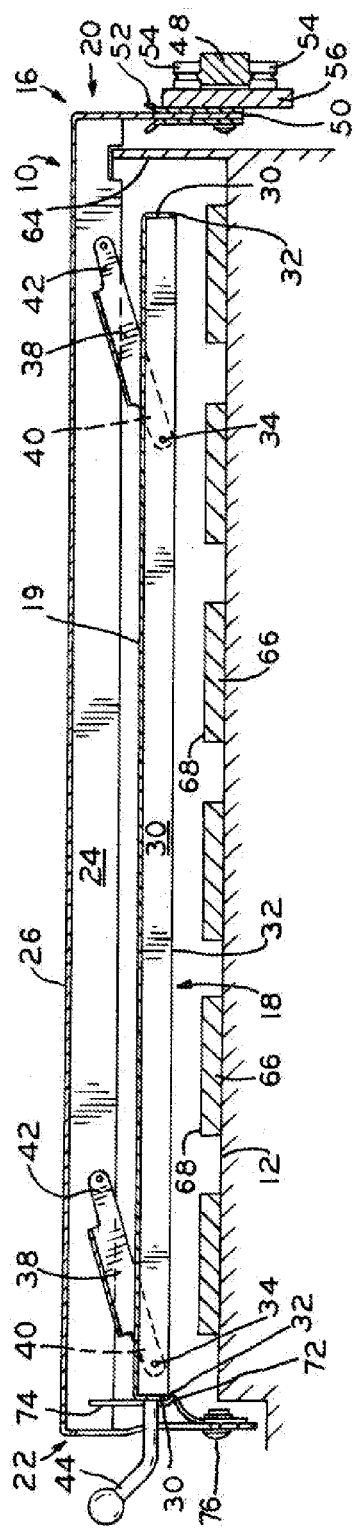
FIG. 3 is a partial cross sectional view of the passive heater and cooking surface of FIG. 1, taken alone line 3-3 of FIG. 1.

As shown in FIGS. 3-5, cover 18 includes top surface 19 and downwardly extending sides 30 having bottom surfaces 32. Sides 30 of cover 18 further include apertures 34 formed therein. Apertures 34 of cover 18 and apertures 28 of carriage 16 are sized to receive pins 36 of connecting arms 38. Connecting arms 38 provide the connection between carriage 16 and cover 18, and also facilitate movement of cover 18 relative to carriage 16. In one embodiment, connecting arms 38 includes opposing pairs of resiliently deformable legs. As shown in FIG. 5, connecting arms 38 include a pair of lower legs 40 and a pair of upper legs 42.

To attach cover 18 to connecting arms 38, lower legs 40 of connecting arms 38 are expanded, i.e., pulled apart from one another, and pins 36 of lower legs 40 are positioned within apertures 34 of sides 30 of cover 18. Similarly, to attach connecting arms 38 to carriage 16, upper legs 42 are contracted, i.e., pressed together, and pins 36 of upper legs 42 are positioned within apertures 28 of rails 24 of carriage 16. As described in detail above, lower legs 40 and upper legs 42 are attached to cover 18 and carriage 16, respectively, via pins 36. However, lower legs 40 and upper legs 42 of connecting arms 38 may be connected to cover 18 and carriage 16, respectively, in any known manner, such as by bolts.

With cover 18 connected to carriage 16, as described in detail above, carriage 16 may be slid along cooking surface 12 to position carriage 16 and cover 18 in the desired orientation. Additionally, handle 44 is positioned within slot 46 of second end 22 of carriage 16, allowing a user to grasp handle 44 to facilitate movement of carriage 16 and/or cover 18. As shown in FIG. 5, guide bar 48 may be utilized to direct movement of carriage 16. Specifically, tab 50 of first end 20 of carriage 16 may be positioned within clamp 52. Clamp 52 is then attached to guide bar 48 via rollers 54 and support block 56. Guide bar 48 may then be secured to brackets 58 via bolts 60. With carriage 16 connected to guide bar 48, as shown in FIGS. 3 and 4, guide bar 48 will direct movement of carriage 16 in the direction of arrows A of FIG. 1. As shown in FIG. 5, movement of carriage 16 will be limited by rollers 54 and brackets 58.

Figure 6:
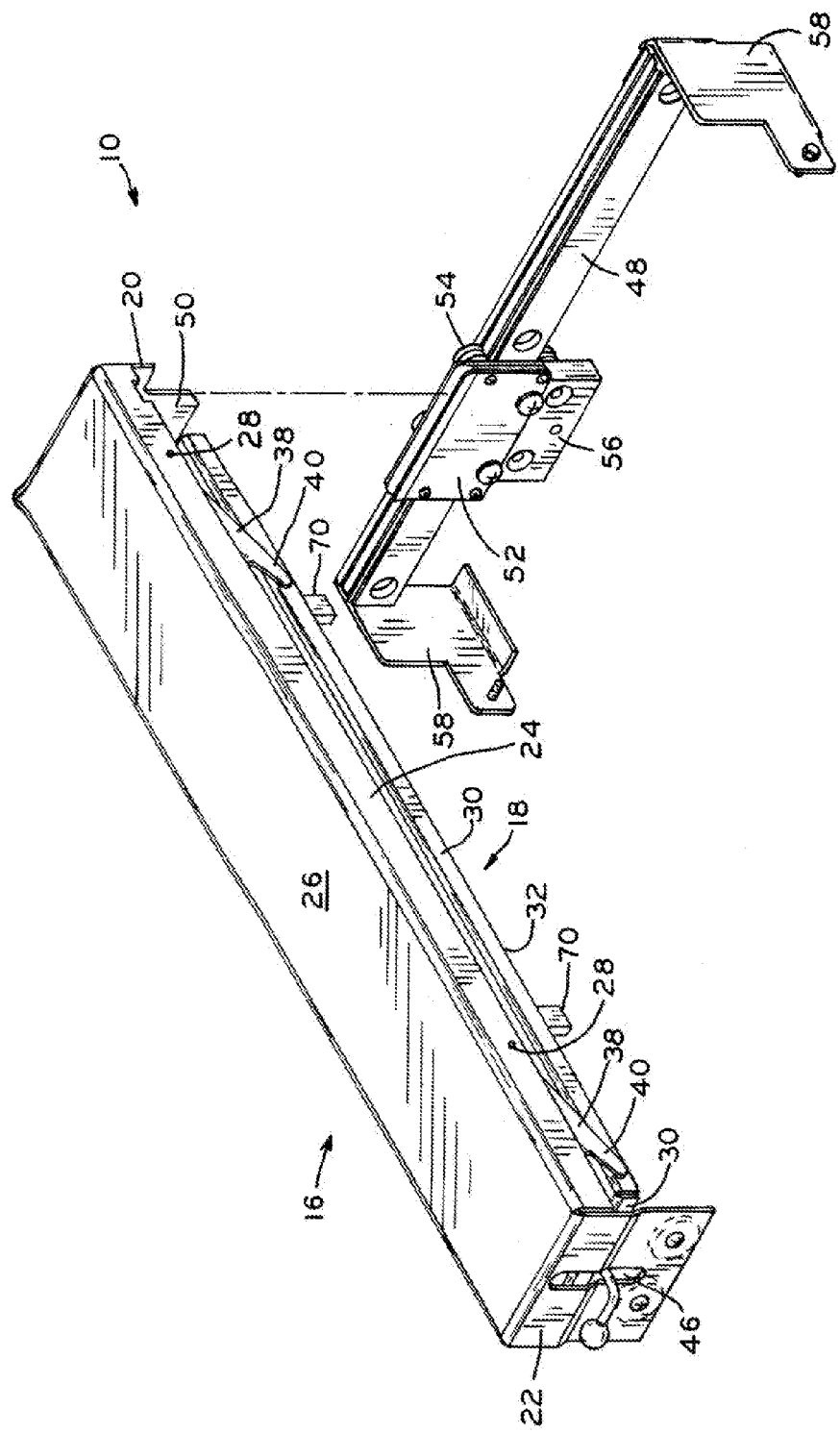
FIG. 6 is an assembly view of another embodiment of the passive heater of FIG. 1.

Second end 22 of carriage 16 can, in certain embodiments, include guide members, such as wheels 62 or other components designed to reduce friction between carriage 16 and cooking surface 12, which facilitate movement of carriage 16. In this embodiment, wheels 62 can cooperate with a guide bar similar to guide bar 48 positioned adjacent second end 22 to direct movement of carriage 16 along cooking surface 12. Additionally, as shown in FIGS. 1-4, carriage 16 may be positioned with wall 64 of griddle 14 separating guide bar 48, and its related components described above, from cooking surface 12. In this embodiment, guide bar 48 and its related components are prevented from contacting food cooking on cooking surface 12. To facilitate cleaning of passive heater 10 or allow it to be used on another cooking surface, carriage 16 (together with passive heater 10) may be removed from clamp 52, as shown in FIG. 6, and separated from guide bar 48.

In use, passive heater 10 may cover and/or cap food items cooking on cooking surface 12. With reference to FIG. 1, passive heater 10 may be positioned over a row of food items, such as hamburgers 66. While the operation of passive heater 10 is described and depicted herein with specific reference to hamburgers 66, the passive heater of the present invention may be utilized with any food items positioned on a cooking surface, such as eggs, chicken, and sausage. Once in this position, cover 18 may be moved from a lifted position, shown in FIGS. 1 and 3, to a lowered position, shown in FIGS. 2 and 4, in which bottom surfaces 32 of cover 18 contact cooking surface 12. Referring to FIG. 3, when cover 18 is in the lifted position (FIGS. 1 and 3), protrusion 72 of resiliently deformable retainer 74 contacts bottom surface 32 of cover 18 to retain cover 18 in the lifted position. Retainer 74 is secured to second end 22 of carriage 16 by screw 76. However, retainer 74 may be secured to carriage 16 in any known manner, such as by rivets. To move cover 18 from the lifted position (FIGS. 1 and 3) to the lowered position (FIGS. 2 and 4), a downward force is exerted on handle 44. When the force on handle 44 is sufficient to deform retainer 74 toward second end 22 of carriage 16, cover 18 can be moved to the lowered position until bottom 32 contacts cooking surface 12.

With cover 18 in the lowered position (FIGS. 2 and 4), retainer 74 moves into an unbiased position extending toward first end 20 of carriage 16. To move cover 18 back into the lifted position (FIGS. 1 and 3), an upward force is exerted on handle 44. When the force exerted on handle 44 is great enough to sufficiently deform retainer 74 toward second end 22, cover 18 may be moved upward until bottom surface 32 of cover 18 pass protrusion 72 of retainer 74. The force exerted on handle 44 may be released and cover 18 is held in the lifted position (FIGS. 1 and 3) by the interaction of protrusion 72 of retainer 74 with bottom surface 32 of cover 18. During movement of cover 18 from the lifted position to the lowered position, and vice versa, the position of carriage 16 may be maintained.

Referring to FIG. 4, when cover 18 is positioned over a row of hamburgers 66 and moved into the lowered position, as described above, passive heater 10 functions as a barrier to prevent the escape of thermal energy from cooking surface 12 near hamburgers 66, as well as from hamburgers 66 themselves. Specifically, cover 18 retains heated air and moisture near hamburgers 66 to speed the cooking thereof. Thus, even after being "flipped", upper surface 68 of hamburgers 66, which are no longer in contact with cooking surface 12, may continue to cook, providing a fully cooked hamburger in less time. Additionally, once hamburgers 66 are substantially fully cooked, cheese may be placed thereon and cover 18 lowered to quickly melt the same.

Figure 2:
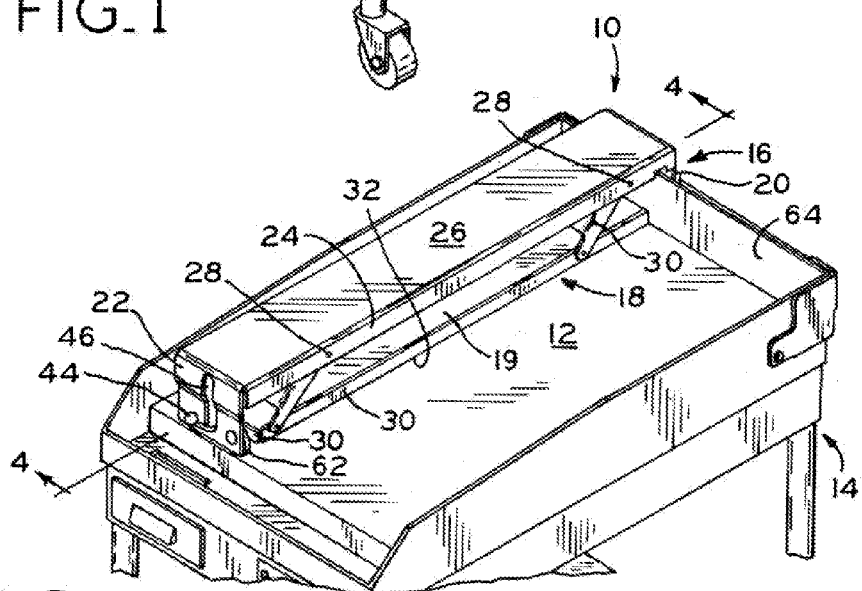
FIG. 2 is a partial perspective view of the passive heater and cooking surface of FIG. 1.

With cover 18 in the position shown in FIGS. 2 and 4, a second row (not shown) of hamburgers 66 may be placed adjacent to the first row positioned under cover 18. In this exemplary embodiment, the area of cover 18 is less than one-half the area of cooking surface 12. Thus, once hamburgers 66 positioned beneath cover 18 are fully cooked, which may be determined by measuring the total cook time, cover 18 may be raised and carriage 16 may be moved to center cover 18 above the second row of hamburgers 66 (not shown). Cover 18 can then be moved from the lifted position to the lowered position and contact between cooked and uncooked hamburgers 66 is substantially prevented.

In one exemplary embodiment, cover 18 may be moved from a lifted position, shown in FIG. 1, to a lowered position, in which bottom surfaces 32 of cover 18 are spaced apart from cooking surface 12 by a predetermined distance. In this embodiment, connecting arms 38 are shortened by a predetermined amount, corresponding to the predetermined distance, to position bottom surfaces 32 above cooking surface 12. Specifically, when cover 18 is in the lowered position, connecting arms 38 extend substantially perpendicularly to cooking surface 12 and space bottom surfaces 32 the predetermined distance from cooking surface 12. This allows cover 18 to cap hamburgers 66. By capping hamburgers 66, enough thermal energy to heat upper surface 68 of hamburgers 66 is retained beneath cover 18, while additional thermal energy may escape through the space between cooking surface 12 and cover 18. This allows the user to accommodate variations in cooking temperatures of different food items, for example. In another exemplary embodiment, a detent mechanism may be used to retain cover 18 at a midpoint where bottom surfaces 32 of cover 18 are spaced apart from cooking surface 12 by a predetermined distance. In this embodiment, the detent mechanism may allow for bottom surfaces 32 of cover 18 to be positioned and retained at a plurality of different predetermined distances from cooking surface 12. Additionally, in one exemplary embodiment, the detent mechanism may further allow cover 18 to be positioned with bottom surfaces 32 contacting cooking surface 12.

In another exemplary embodiment, tabs 70, shown in FIG. 6, are connected to bottom surfaces 32 such that they extend downward therefrom and toward cooking surface 12. Thus, when cover 18 is moved to the lowered position, tabs 70 contact the cooking surface and retain bottom surfaces 32 of cover 18 spaced apart from cooking surface 12, as described in detail above. Further, an additional pair of tabs 70 may be positioned on the opposing side of cover 18 opposite the pair of tabs 70 shown in FIG. 6. While described and depicted herein as opposing pairs of tabs, a plurality of tabs 70 may be provided in any number and may take any configuration, such as extending for bottom surfaces 32 of cover 18 at opposing ends of cover 18.

Advantageously, the use of tabs 70 prevents connecting arms 38 from extending downward into a vertical position relative to cooking surface 12. This allows for cover 18 to move substantially vertically when handle 44 is initially raised. In contrast, when connecting arms 38 are in a vertical position relative to cooking surface 12, the first movement of handle 44 away from cooking surface 12 results in cover 18 moving substantially horizontally relative to cover 18.

In one exemplary embodiment, bottom surface 32 of cover 18 is positioned between cooking surface 12 and upper surface 68 of hamburgers 66. In another exemplary embodiment, passive heater 10 is configured so that when cover 18 is in the lowered position, cover 18 is no more than three inches from cooking surface 12 and bottom surface 32 extends below the top surface of the food to be cooked.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for cooking food, comprising:
a cooking device having a heatable cooking surface;
a passive heater, comprising:
a carriage actuatable to move along said cooking surface; and
a cover connected to said carriage by a connection, whereby actuation of said carriage moves said cover along the cooking surface, said cover having a bottom surface, said cover selectively moveable relative to said cooking surface between a lowered position in which said bottom surface of said cover contacts said cooking surface, an intermediate position in which said bottom surface of said cover is spaced from said cooking surface by a first predetermined distance, and a lifted position in which said bottom surface of said cover is spaced from said cooking surface by a second predetermined distance, said second predetermined distance greater than said first predetermined distance, said connection operable to selectively retain said cover in one of said lowered position, said intermediate position and said lifted position, whereby heat is retained between said cover and the cooking surface.

2. The passive heater of claim 1, further comprising at least one connecting arm, said connecting arm connecting said carriage to said cover, wherein said connecting arm pivots relative to said carriage and said cover.

3. The passive heater of claim 1, further comprising a guide bar, said carriage attached to said guide bar to direct movement of said carriage along the cooking surface.

4. The passive heater of claim 3, wherein said carriage further comprises a first end and a second end, said carriage attached to said guide bar at said first end, said second end of said carriage having guide means for facilitating movement of said carriage connected thereto, said guide means cooperating with said guide bar to direct movement of said carriage.

5. The passive heater of claim 1, wherein said cover comprises a top surface, said top surface of said cover having an area less than or equal to one half of the area of the cooking surface.

6. The passive heater of claim 1, wherein said cover comprises a substantially rectangular shape, whereby, with said cover contacting the cooking surface, said cover may cap a row of food positioned on the cooking surface.

7. A device for cooking food, comprising:
a cooking device having a heatable cooking surface;
a passive heater, comprising:
a carriage positioned adjacent a cooking surface, wherein said carriage may be actuated to move along the cooking surface; and
a cover connected to a said carriage by a connection, said cover having a lifted position, an intermediate position and a lowered position, said cover having a bottom surface, said bottom surface of said cover spaced a first predetermined distance from the cooking surface in the lifted position, said cover spaced a second predetermined distance from the cooking surface in the intermediate position, said cover spaced a third predetermined distance from the cooking surface in the lowered position, said first predetermined distance greater than said second predetermined distance, said second predetermined distance greater than said third predetermined distance said cover capable of being alternatively moved from said lifted position to one of said lowered position and said intermediate position, said connection operable to selectively retain said cover in one of said lowered position, said intermediate position and said lifted position to cap food on the cooking surface.

8. The passive heater of claim 7, wherein said cover comprises a bottom surface, said bottom surface of said cover positioned a distance from the cooking surface which is less than the height of the food on the cooking surface when said cover is in said lowered position.

9. The passive heater of claim 8, wherein said bottom surface of said cover is no more than three inches from the cooking surface when said cover is in said lowered position.

10. The passive heater of claim 8, wherein said carriage further comprises guide means for facilitating movement of said carriage.

11. The passive heater of claim 7, wherein said cover comprises a bottom surface, said bottom surface of said cover positioned a distance of no more than three inches from the cooking surface when said cover is in said lowered position.

12. The passive heater of claim 7, further comprising a guide bar and guide means for facilitating movement of said carriage, said carriage attached to said guide bar, whereby said guide bar and said guide means cooperate to direct movement of said carriage.

13. The passive heater of claim 7, further comprising a connecting arm, said connecting arm connecting said carriage to said cover, wherein said connecting arm pivots relative to said carriage and said cover.

14. The passive heater of claim 7, wherein said carriage further includes a retainer, said retainer configured to retain said cover in said lifted position.

15. The passive heater of claim 7, wherein said cover further comprises a substantially rectangular shape, whereby, in said lowered position, said cover may cap a row of food positioned on the cooking surface.

16. The passive heater of claim 7, wherein said cover further comprises at least one tab extending from said cover, said at least one tab configured to contact said cooking surface when said cover is in said lowered position.

* * * * *